United States Patent
Maret

(10) Patent No.: US 6,769,809 B2
(45) Date of Patent: Aug. 3, 2004

(54) ASYMMETRIC DOUBLE ROW ANGULAR CONTACT BALL BEARING, AND CANTILEVER MOUNTING OF GEARS ON SUCH A BEARING

(75) Inventor: Pierre Maret, Lambesc (FR)

(73) Assignee: Eurocopter, Marignane Cedex (FR)

( * ) Notice: Subject to any disclaimer, the term of this patent is extended or adjusted under 35 U.S.C. 154(b) by 56 days.

(21) Appl. No.: 10/157,448

(22) Filed: May 29, 2002

(65) Prior Publication Data

US 2002/0186910 A1 Dec. 12, 2002

(30) Foreign Application Priority Data

Jun. 6, 2001 (FR) .............................. 01 07398

(51) Int. Cl.[7] .................. F16C 33/60; F16C 19/56
(52) U.S. Cl. .................. 384/512; 384/513; 384/540
(58) Field of Search .................. 384/512, 513, 384/516, 517, 519, 537, 540, 542, 543, 546, 547, 453, 461, 490, 491, 499, 500, 502, 504, 505, 506; 74/423, 424, 417

(56) References Cited

U.S. PATENT DOCUMENTS

| | | | | |
|---|---|---|---|---|
| 1,159,652 A | * | 11/1915 | Culver et al. | ........ 74/424 |
| 1,928,109 A | * | 9/1933 | McCormick | ........ 384/583 |
| 2,019,464 A | * | 10/1935 | Riblet | ........ 74/424 |
| 2,230,899 A | * | 2/1941 | McGrath | ........ 74/424 |
| 3,234,809 A | * | 2/1966 | Dunn | ........ 74/423 |
| 3,937,535 A | * | 2/1976 | Ladin | ........ 384/540 |
| 4,824,264 A | | 4/1989 | Hoebel | ........ 384/473 |
| 5,078,025 A | * | 1/1992 | Wei et al. | ........ 74/417 |
| 5,226,737 A | | 7/1993 | Sandy, Jr. | ........ 384/512 |
| 5,687,016 A | * | 11/1997 | Seto | ........ 384/490 |
| 6,015,264 A | * | 1/2000 | Violette et al. | ........ 384/517 |
| 6,048,101 A | * | 4/2000 | Rasmussen | ........ 384/517 |
| 6,100,809 A | * | 8/2000 | Novoselsky et al. | ........ 384/513 |

FOREIGN PATENT DOCUMENTS

| | | |
|---|---|---|
| DE | 19 04 954 | 6/1970 |
| FR | 2 149 620 | 3/1973 |
| WO | WO 89 01101 | 2/1989 |

* cited by examiner

Primary Examiner—Thomas R. Hannon
(74) Attorney, Agent, or Firm—Sturm & Fix LLP

(57) ABSTRACT

The bearing is an angular contact ball bearing with two asymmetric rows of balls, with a one-piece outer race and an inner race having two matched inner half-races side by side and able to be axially preloaded against each other when the bearing is mounted on the shaft of a gear the set of teeth of which cantilevers out from the bearing which has its row of larger-diameter balls on the same side as the set of teeth. Preloading may be provided by a nut screwed onto the shaft and tightened up against one of the inner half-races until the latter bears against the other inner half-race. A lock nut may hold the nut in position. The gear with its set of teeth and its shaft, the bearing with its large-diameter balls on the same side as the set of teeth, and the preloading device constitute a modular assembly, premounted and preloaded prior to fixing to a housing using a flange belonging to the outer race.

6 Claims, 3 Drawing Sheets

Figure 4:
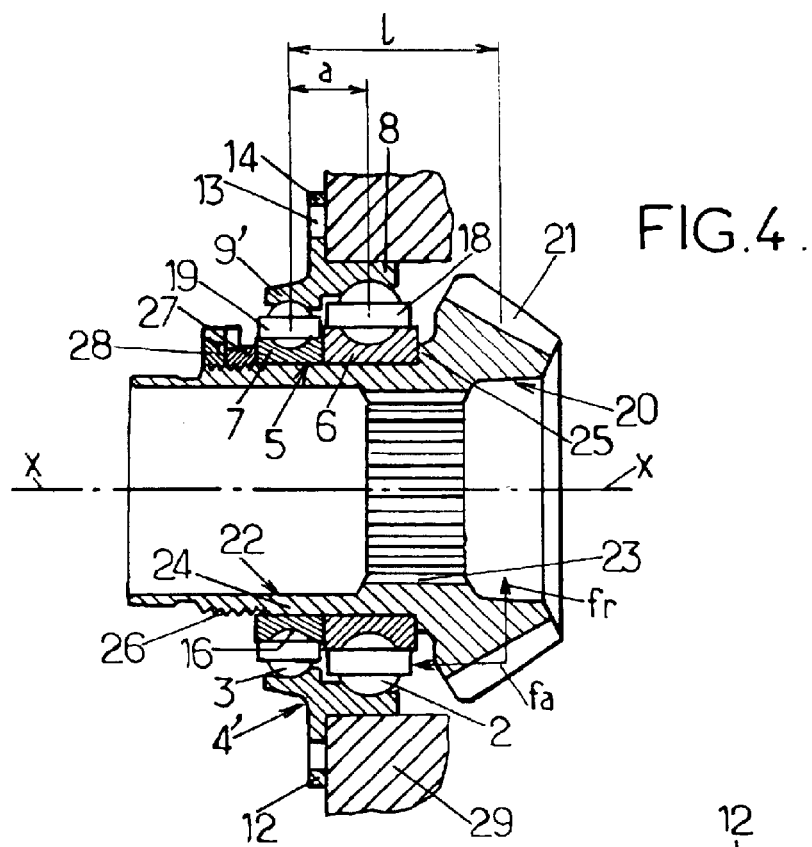

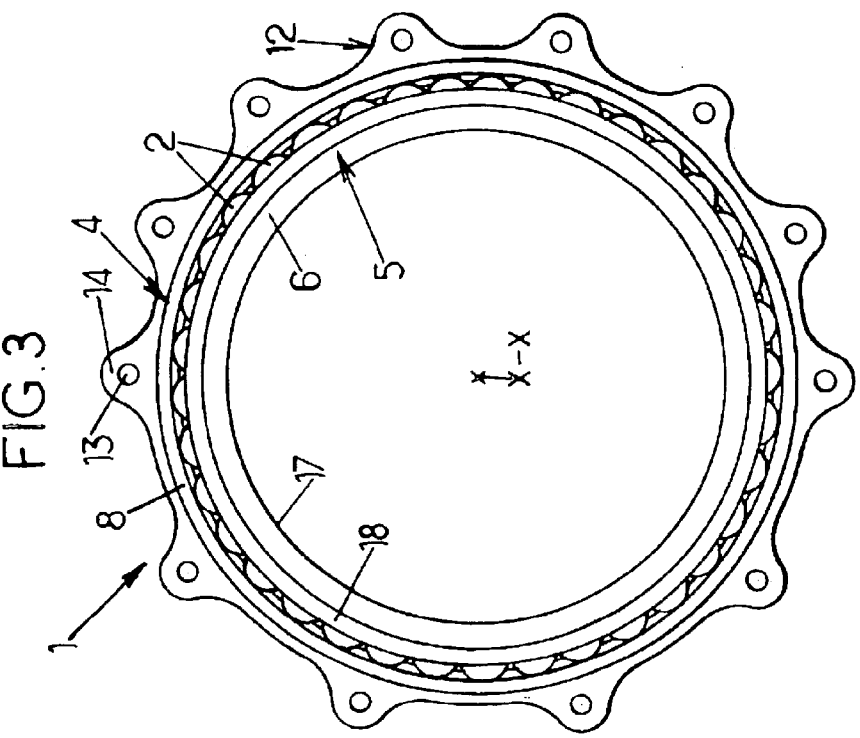
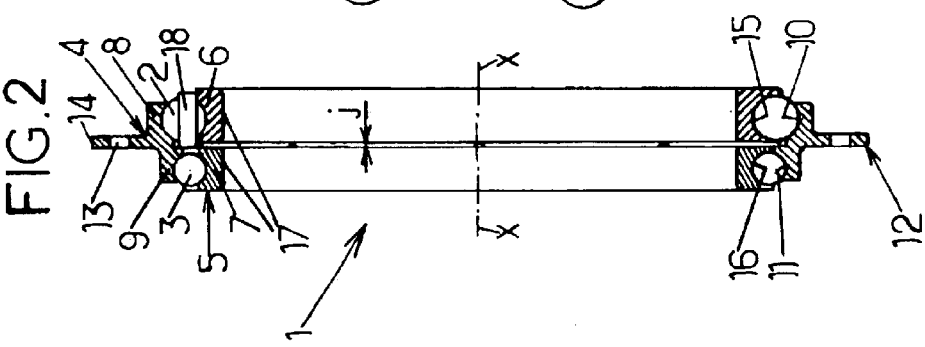
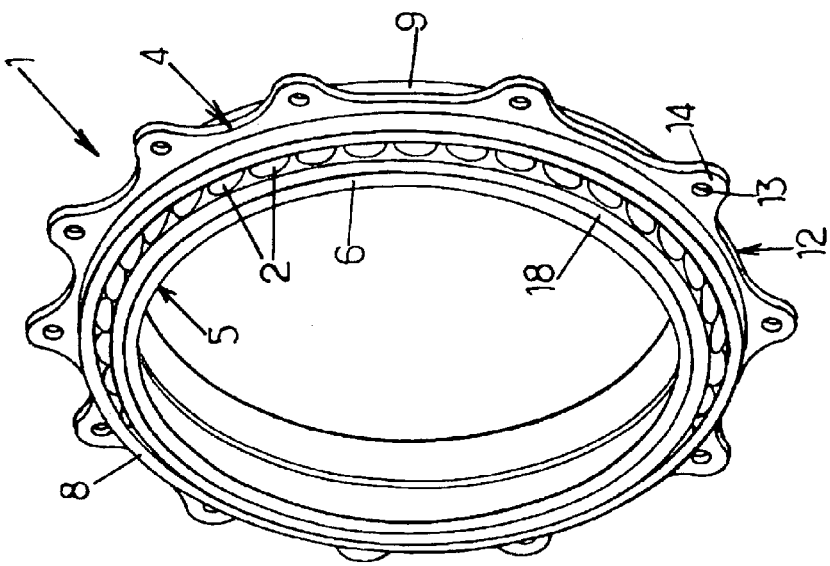

ASYMMETRIC DOUBLE ROW ANGULAR CONTACT BALL BEARING, AND CANTILEVER MOUNTING OF GEARS ON SUCH A BEARING

The invention relates to a double row angular contact ball bearing, the special structure of which is particularly well suited to the mounting of gears to rotate with respect to supports, particularly gearboxes and transmission gearboxes and especially helicopter auxiliary or main transmission gearboxes.

The invention also relates to a cantilever mounting of gears on a special-purpose bearing according to the invention, particularly for mounting helicopter main or auxiliary transmission gearbox gears, and the invention finally relates to a modular assembly comprising at least one gear, a specialized purpose bearing according to the invention, and a device for preloading the bearing, on which the gear is cantilever mounted, according to the special-purpose mounting according to the present invention.

In helicopter transmission gearboxes, whether these be main transmission gearboxes inserted between the propulsion units, generally turbo engine units, and the main rotors, and arranged as at least one step-down stage, for reducing the rotational speed of the output shaft or shafts of the propulsion units to a nominal speed at which the main rotors are rotated, or whether these be auxiliary transmission gearboxes inserted between rear transmission shafts connected to take-offs or auxiliary outputs from main transmission gearboxes, and tail or anti-torque rotors for driving the latter in rotation, the gears of such transmission gearboxes are generally supported by at least two rolling bearings, the rolling bodies of which may be balls or rollers, generally cylindrical or conical ones.

One of the bearings may be mounted at the "nose" of the gear (on the opposite side to the side via which the gear is driven in rotation), while the other bearing is mounted at the "tail" of the gear (on the side via which the gear is driven in rotation), but the gear may also be mounted on the same side of at least two rolling bearings which, irrespective of the mounting, reacts the radial loads while just one of the bearings reacts the axial load.

When the mounting of a gear entails precise axial positioning, as may be the case with a spiral bevel gear, the meshing conditions of which may entail either a minimum clearance or no axial clearance, particularly when the level of dynamic loadings on the gear is high, bearings are combined in what are known as "O" or "X" configurations, preloaded by adjustment with angular contact ball bearings or taper roller bearings.

Whether the rolling bodies in the bearings are tapered rollers or balls, it is known that "O" bearings are combinations of at least two bearings such that, if the normals to the points of contact between the rolling bodies and the raceways of the corresponding races are considered, the intersections of these normals with the axis of the bearings delimit an axial segment of a length that exceeds the axial distance joining the extreme points of contact (axially farthest apart) of the rolling bodies, so that the said normals to the points of contact delimit, about the axis of the associated bearings, a pseudo "O".

In the case of an "X" configuration of bearings, the said normals to the points of contact between the rolling bodies and the races of the bearings diverge and are directed radially and axially towards the outside of the bearings, so as to delimit, on the common axis of the bearings, a segment of a length shorter than the axial distance joining the extreme points of contact (in reverse set-up by comparison with an "O" configuration of bearings).

The preloading of two associated bearings, for example two angular contact ball bearings mounted in opposition ("O" configuration), is achieved after shims or spacers of variable and adjustable axial thickness have been arranged between the inner races and the outer races of the two bearings, so that, in the presence of such suitable shims or spacers, the axial clamping of the inner race of a bearing against the corresponding shims and towards the inner race of the other bearing, bearing against a shoulder, imposes a "no load" pressure on the two bearings. Under these conditions of mounting of this arrangement, the application of external forces to the bearings leads to a reduction in the axial preload, which means that the bearings can run with a small or practically zero clearance, corresponding to the required conditions. This preload entails that the axial dimensions of the spacers or shims fitted, for example peel shims, are determined after a succession of mountings and measurements. This results in lengthy and tricky adjustment of the preload, this drawback adding to the one ensuing from the need to fit the said spacers or shims in order to control the preload.

In order to dispense with the need to adjust the preload, it is known practice for the two bearings, which are matched and the internal geometry of which is defined to obtain the desired preload by construction, to be mounted back to back and for the shims or spacers and adjustments thus to be eliminated. However, the two bearings are then likely to be too heavily loaded, and it is known practice for this drawback to be remedied by fitting a third bearing, generally a cylindrical roller bearing, on the line of shafts, to provide additional support and thus avoid cantilever mounting.

To react the axial loads exerted on gears while at the same time mounting them for rotation, it has also already been envisaged for use to be made of other types of bearing, particularly ball bearing variants of the "deep groove" type with three or four points of contact (of the balls with the races), of which one of the two races, generally the inner race, is split into two half-races.

In a deep groove bearing it is known that the raceway of each race, inner or outer, has just one curvature, which is not necessarily the same for both races. Because of this or these curvatures, one consequence of the radial clearance, needed for such a bearing to run correctly, is that such a bearing has fairly large axial clearances which do not allow sufficiently precise mounting, particularly of gears in the axial direction.

To avoid these disadvantages, it has been proposed for use to be made of bearings of the "three-point contact" type, in which one of the races, generally the inner race, is made in two parts so that the centres of curvature of the two raceway grooves formed respectively in the two parts of the split race are offset by an axial distance which corresponds to a saving in axial clearance, or alternatively "four-point contact" bearings, similar to "three-point contact" bearings as regards the race which is split into two parts, whereas in the other race, which is of one piece, the raceway groove is machined with an ogee-shaped cross section having two radii of curvature with centres which are axially offset, each with respect to the other and both with respect to the centre of the balls.

This results in bearings which are more precise and have a smaller axial clearance than conventional deep groove bearings.

However, among the various solutions known in the prior art for reacting the axial loads exerted on gears, the first solution, which consists in using ball bearings of the three-point or four-point contact type, has the drawback of leaving degrees of freedom in the axial direction.

A second solution, which consists in using a preloaded mounting of two associated bearings, which are tapered roller bearings or angular contact ball bearings, to cancel these degrees of freedom in the axial direction, does, on the other hand, have the drawback of entailing adjustment of the preload by insertion of shims of variable and adjustable axial thickness. Furthermore, in the case of mounting "O" configured or "X" configured bearings, it is necessary to adjust the preload while at the same time making sure that the gear is positioned precisely in the axial direction, this making mounting operations more complicated and increasing the costs of assembly in production and of maintenance.

Note that the use of two bearings, one of which is mounted at the "nose" of the gear and the other of which is mounted at the "tail" of the gear, may have the drawback of prohibitive bulk, because mounting a bearing at the "nose" of the gear and its size are not always compatible with a sufficiently small diameter, at the end of the gear, to allow a grinding wheel in to grind the teeth, in the case of the gear being a spiral bevel gear.

Finally, the last solution, which consists in using a mounting of two bearings back to back and preloaded, supplemented by a third bearing providing an additional support, has the disadvantages that the mass and bulk of the assembly are high, and that it is trickier to mount and entails a longer amount of maintenance time, which is a disadvantage in terms of maintenance.

The problem underlying the invention is to provide a bearing which is particularly suited to gearbox and transmission gearbox architectures observing small bulk and in which the mountings and removals of the gears are quick and easy, the mounting of the gears allowing a significant saving in axial bulk and a saving in weight, and an increase in the precision with which the sets of teeth of the gears can be axially positioned.

To this end, the invention provides a double row angular contact ball bearing, of a known type, comprising:

a one-piece outer race, having two internal raceways arranged substantially in opposition and formed of raceway grooves the concave side of which faces radially towards the axis of the bearing and each of which faces axially towards one respective side of the bearing, an inner race, consisting of two matched inner half-races, arranged side by side, able to be axially preloaded against each other when the bearing is mounted, and each having an external raceway formed of a raceway groove the concave side of which faces radially towards the outside of the bearing and in such a way that the external raceway of each inner half-race substantially faces a respective one of the two internal raceways of the outer race, two rows of balls, in which the balls in each row are arranged between the two raceways of a respective one of the two pairs of opposing raceways, and in angular contact with the said raceways, and at least one ball cage holding the balls of a row of balls and arranged between the outer race and the corresponding inner half-race, wherein the balls of one of the two rows are of a diameter greater than the diameter of the balls of the other row, so that the bearing has two asymmetric rows of balls.

To make it easier to preload, without adjusting, the bearing and to mount it on a shaft of a gear, the two inner half-races advantageously have an internal bore of the same diameter.

Advantageously also, the two inner half-races may have external raceways of substantially the same diameter measured at the bottom of the corresponding raceway groove, and/or the raceway groove forming the external raceway of each of the two inner half-races may have a concave side also facing axially towards the other inner half-race.

To limit its mass and its bulk, the one-piece outer race may advantageously have two axial end parts with a cylindrical or cylindro-conical external face, of which one, surrounding the row of larger-diameter balls, has an outside diameter greater than the outside diameter of the other part, surrounding the smaller-diameter row of balls.

To make the bearing easier to mount on a support, such as the housing of a transmission gearbox, the one-piece outer race may advantageously have a fastening flange projecting radially outwards. When the one-piece outer race has two axial end parts with a cylindrical or cylindro-conical external face and different diameters, as set out hereinabove, the fastening flange advantageously projects radially substantially between the said two axial end parts.

In such a bearing, it is advantageous for at least one ball cage and preferably each of them when the bearing has two ball cages, to be centred about at least one cylindrical bearing surface on the external face of the corresponding inner half-race.

Another subject of the invention is a mounting of at least one gear in a rolling bearing, intended for mounting the gear to rotate with respect to a support, such as a helicopter main or auxiliary transmission gearbox housing, and the principle of the mounting according to the invention relies on the use of a single double row angular contact ball bearing in which the two rows are asymmetric, preloaded without adjustment, according to the invention and as defined hereinabove, and in which the gear is cantilever mounted so that, by comparison with the embodiments of the prior art, in which the gear is mounted between two bearings, one of which is at the "nose" of the gear and the other of which is at the "tail" of the gear, the bearing according to the invention is mounted, also according to the invention, at the "tail" of the gear, the "nose" bearing being omitted.

More specifically, the mounting of at least one gear in a rolling bearing is characterized, according to the invention, in that a set of teeth of the gear is secured coaxially to one axial end of a shaft pushed coaxially into the two inner half-races of a double row angular contact ball bearing in which the two rows of balls are asymmetric, according to the invention, the gear cantilevering out from the bearing mounted in such a way that the row of larger-diameter balls is arranged on the same side as the set of teeth of the gear, and that the outer race of the bearing is able to be fixed to the said support.

In running, the row of balls closest to the set of teeth of the gear is the most heavily loaded, which is why the balls in this row are of a diameter larger than the diameter of the balls of the other row, which essentially reacts the preload forces. Each of the two asymmetric rows of balls is thus dimensioned according to the loads applied, which makes it possible to reduce the axial bulk and the mass of the bearing.

When the gear has the overall form of a bevel gear, the bearing is advantageously arranged axially offset with respect to the set of teeth, on the larger-diameter end of the bevel gear teeth.

This mounting no longer exhibits the drawbacks of the mountings known from the prior art and set out hereinabove. In particular, the fact that the single bearing used consists of a double row of angular contact balls arranged in opposition, and which can be preloaded, allows axial and radial loads to be reacted while at the same time allowing the gear to be mounted with precise axial clearance, or even with no axial clearance. The one-piece outer race can easily be fixed to the housing, particularly when the said race has the aforementioned flange. The two half-races of the inner race are matched by the bearing manufacturer to obtain the desired preload once the bearing has been mounted on the shaft of the gear, and the internal geometry of the bearing is, in the known way, defined to take account of the mounting and running conditions, particularly the type of mounting of the bearing on the shaft, by interference or shrink-fitting, and the conditions of expansion, temperature, etc.

Advantageously, the mounting of the gear according to the invention is such that before fixing the outer race of the bearing to the support, the two inner half-races are axially preloaded against each other, when the bearing is mounted on the shaft of the gear, using a preloading device, preferably of the type comprising at least one nut and a member for locking the said nut, such as a lock nut, at least the said nut being screwed onto a threaded part of the shaft, it being possible for the said threaded part to project axially with respect to the bearing on the opposite side to the set of teeth of the gear.

The mounting of a gear on a bearing according to the invention therefore entails no adjustment, the preload being provided by design.

The cantilever mounting of the gear according to the invention, with the type of bearing specific to the invention, is of benefit mainly in helicopter transmission gearboxes, for which this mounting of a gear and of the bearing is particularly suited to transmission gearbox architectures which entail small sizes and ease of mounting and removal. In this application, it is advantageous for the shaft of the gear to be tubular and comprise driving means, such as axial splines, for driving the gear in rotation about the axis of its shaft by means of a driving member, such as a drive shaft, fitted with complementary axial splines.

When the shaft of the gear is a shaft common to two gears, and is therefore secured to two sets of teeth, arranged one on each side of the bearing, the bearing is mounted in such a way that the row of larger-diameter balls faces axially towards that one of the sets of teeth which, in service, is axially loaded the more heavily.

A final subject of the invention is a modular assembly, characterized in that it comprises:

- at least one gear comprising a set of teeth secured coaxially to an axial end of a shaft,
- a bearing according to the invention and as defined hereinabove, mounted on the shaft of the gear in such a way that the shaft is pushed into the two inner half-races of the bearing and that the row of larger-diameter balls is arranged towards the set of teeth of the gear, and
- a preloading device equipping the shaft of the gear and/or the bearing for axially preloading the two inner half-races of the bearing.

The use of such a modular assembly considerably simplifies the mounting and removal of a gear by comparison with the embodiments of the prior art, and a gear thus equipped and associated with such a double row angular contact ball bearing with asymmetric rows of balls allows a significant saving to be made in terms of axial bulk and in terms of mass. Furthermore, the precision on the axial position of the set of teeth of the gear is increased by means of the reduction in the accumulation of dimensions by comparison with the aforementioned mountings of the prior art.

Figure 5:
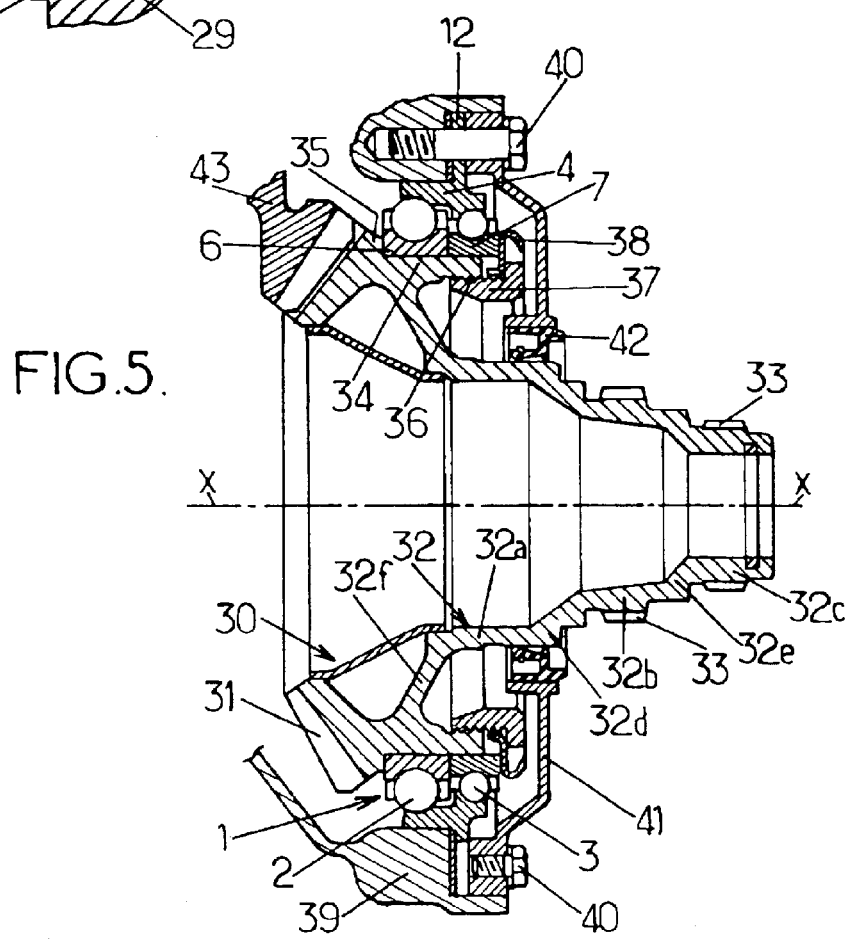
Figure 6:
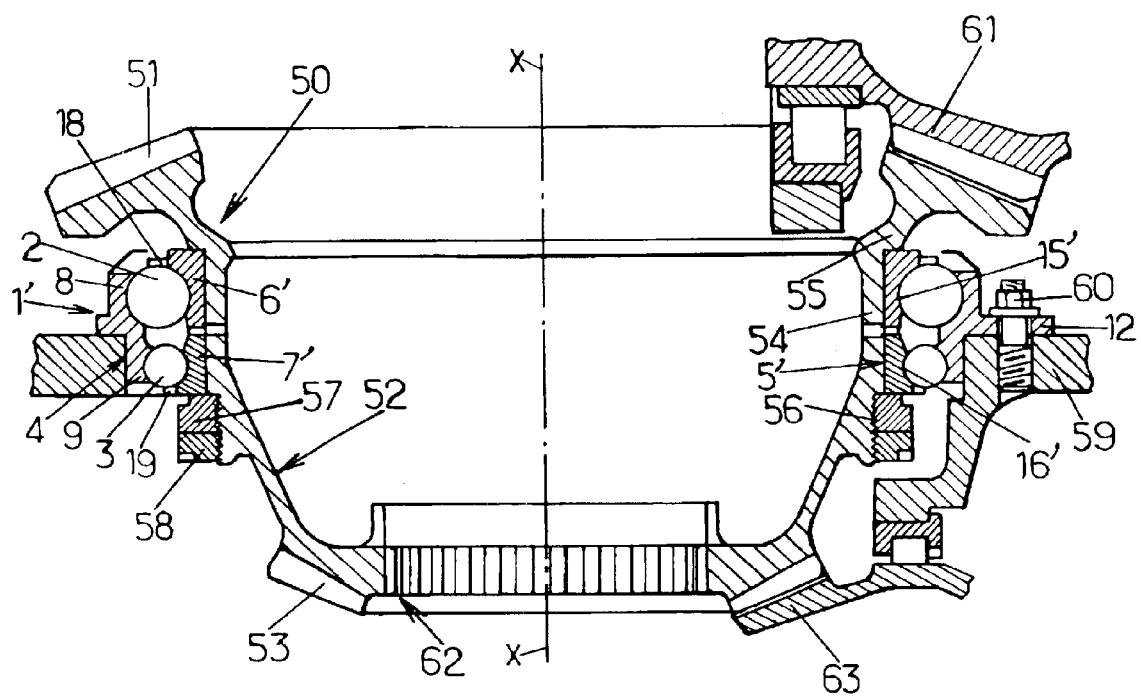

Other advantages and features of the invention will stem from the description given hereinbelow, nonlimitingly, of some exemplary embodiments which are described with reference to the appended drawings in which:

FIGS. 1 to 3 schematically depict, in perspective, in diametral section and in side elevation respectively, an asymmetric double row angular contact ball bearing according to the invention, FIG. 4 depicts an axial section of a first exemplary cantilever mounting of a gear on a bearing analogous with that of FIGS. 1 to 3, in a first example of a helicopter tail transmission gearbox, FIG. 5 is a view analogous to FIG. 4 for a second exemplary cantilever mounting of a gear in a helicopter tail transmission gearbox, and FIG. 6 is an exemplary mounting of a cantilever mounting of a gear in a helicopter main transmission gearbox on a bearing analogous to that of FIGS. 1 to 3.

FIGS. 1 to 3 depict a double row ball bearing 1 with balls 2 and 3 in angular contact with a one-piece outer race 4 and an inner race 5 that is made of two inner half-races 6 and 7 which are arranged side by side and axially separated from one another by an initial clearance j after machining, which is a precise clearance predetermined by design, before the bearing is mounted on a shaft, the two inner half-races 6 and 7 being able to be preloaded axially against one another in service.

The one-piece outer race 4 comprises two axial end parts 8 and 9 each having a cylindrical external face and of which one, 8, which surrounds the row of balls 2 which have a diameter greater than the diameter of the balls 3 of the other row, has an outside diameter which is greater than the outside diameter of the other axial end part 9 surrounding the row of smaller-diameter balls 3.

For this purpose, each of the axial end parts 8 and 9 has a respective one of two internal raceways 10 and 11, produced in the form of raceway grooves with symmetry of revolution about the axis X—X of the bearing 1 and oriented substantially back to back, that is to say in the form of grooves 10 and 11 the radial cross section of which is in the shape of a circular arc with their concave face facing radially towards the axis X—X of the bearing 1 and axially each facing laterally towards the outside of the bearing 1, on the side of the corresponding axial end part 8 or 9, the raceway 10 of the end part 8 having a radius of curvature greater than that of the raceway 11 of the axial end part 9, so as to accommodate balls 2 the diameter of which exceeds that of the balls 3.

Substantially between the axial end parts 8 and 9, of different outside diameters, the outer race 4 has a flange 12, projecting radially outwards, for securing the bearing 1, via its outer race 4, to a support or housing, using fasteners such as screws or bolts (not depicted) passing through axial drillings 13 made in lugs 14 distributed over the flange 12 in the circumferential direction.

Each of the inner half-races 6 and 7, which are matched, have an external raceway 15 and 16 respectively, having the shape of a raceway groove also exhibiting symmetry of revolution about the axis X—X of the bearing 1, with a radial cross section in the shape of a circular arc and the concave side of each of which faces radially towards the outside of the bearing 1, so that the external raceway 15 or 16 of the inner half-race 6 or 7 substantially faces the respective internal raceway 10 or 11 of the outer race 4.

Like the internal raceways 10 and 11, the external raceways 15 and 16 have, in the case of the former, a radius of curvature greater than that of the latter, so as to accommodate the balls 2 the diameter of which exceeds that of the balls 3. However, each of the external raceways 15 and 16 of the inner half-races 6 and 7 is delimited between two cylindrical axial parts with the same external radius, one of which is the inner one (towards the other inner half-race 7 or 6) and the other of which is the outer one (towards the outside of the bearing 1), and the two inner half-races 6 and 7 have external raceways 15 and 16 which respectively have the same diameter, measured at the bottom of the corresponding raceway groove, the internal bore 17 of the two inner half-races 6 and 7 also being of the same diameter.

The larger-diameter balls 2 are mounted in rolling contact between the external raceway 15 of the inner half race 6 and the internal raceway 10 opposite on the outer race 4, while the smaller-diameter balls 3 of the other row are mounted in rolling contact between the external raceway 16 of the inner half-race 7 and the internal raceway 11 opposite on the outer race 4.

The balls 2 and 3 of the two asymmetric rows are thus mounted with angular contact, with respect to a radial plane of the bearing, which corresponds substantially to the plane of axial contact of the inner half-races 6 and 7 via the sides of their internal axial part when the bearing 1 is axially preloaded on mounting, in the configuration for use on a shaft, as described hereinafter with reference to FIGS. 4 to 6.

The bearing 1 also comprises a ball cage for each of the two rows of balls 2 and 3 and, to simplify FIGS. 1 to 3, just one ball cage 18, holding the larger-diameter balls 2, has been depicted schematically. This ball cage 18, which is of one piece, is arranged between the outer race 4 and the corresponding inner half-race 6, on which this ball cage 18 is centred on the bearing surfaces formed by the inner and outer cylindrical axial parts on each side of the raceway 15. The other ball cage is arranged and centred in a similar way between the other axial end part 9 of the outer race 4 and the inner half-race 7. Each of the cages such as 18 is, in the known way, penetrated radially with cavities each housing a respective one of the corresponding balls 2 or 3.

FIG. 4 depicts the mounting of an input gear of a bevel gear pair of a helicopter tail transmission gearbox, using an asymmetric double row angular contact ball bearing which differs from that of FIGS. 1 to 3 only in the shape of the outer face of the axial end part 9' (housing the row of small-diameter balls 3) of the outer race 4', this shape no longer being cylindrical, as it was in the example of FIGS. 1 to 3, but frustoconical and converging axially towards the outside of the bearing, with a maximum diameter, where it meets the radial flange 12, smaller than the constant diameter of the cylindrical external face of the other axial end part 8 of the outer race 4'.

Also depicted, moreover, is the ball cage 19 holding the small-diameter balls 3, which has the same overall one-piece structure with cavities and which is centred in the same way as the ball cage 18, that is to say on the two cylindrical bearing surfaces delimited on the external face of the inner half-race 7, on each side of its raceway 16.

The input gear of the bevel gear pair of this auxiliary transmission gearbox is a bevel gear 20 with spiral cut teeth 21, of frustoconical overall shape, secured to one axial end of a tubular shaft 22, which is coaxial with the set of teeth 21 and extends on the larger outside diameter end of this set of teeth 21. The shaft 22 has internal axial splines 23 projecting radially towards the inside of its bore, to allow the gear 20 to be driven in rotation about its axis X—X by collaboration of the splines 23 with complementary external axial splines on the rear end of a rear transmission shaft (not depicted) which engages in the tubular shaft 22 via the opposite axial end thereof to the end that has the set of teeth 21, the front end of this transmission shaft being connected to a take-off at the output from the helicopter main transmission gearbox, in a well-known way. The shaft 22 also has a cylindrical part 24, on the external face of which a cylindrical bearing surface is delimited between a radial shoulder 25, where the cylindrical part 24 meets the set of teeth 21, and an external screw thread 26 on a threaded part of the shaft 22 which extends its cylindrical part 24 on the opposite side to the set of teeth 21.

When the gear 20 is mounted on the double row bearing with asymmetric rows of balls 2 and 3, the shaft 22 is pushed coaxially into the two inner half-races 6 and 7 of the bearing, which is offered up in such a way that its row of large-diameter balls 2 is arranged towards the set of teeth 21, and the internal bore 17 of the inner half-races 6 and 7 is engaged on the external cylindrical bearing surface of the cylindrical part 24 of the shaft 22 until the external lateral face of the inner half-race 6 comes into abutment against the shoulder 25 of the gear 20. Through this mounting, the set of teeth 21 of the gear 20 cantilevers out from the bearing, and the axial clearance between the inner half-races 6 and 7 becomes j', greater than the clearance j calibrated by design, because of the mounting with "interference" and because of the shrink-fitting conditions which mean that the face of the internal bore 17 of the inner half-races 6 and 7 will be shifted radially outwards slightly which, because of the presence of the balls 2 and 3 mounted in opposition with angular contact, will lead to a small axial displacement, towards the outside of the bearing, of the inner half-races 6 and 7 and therefore, given that the inner half-race 6 bears against the shoulder 25, will lead to the other inner half-race 7 being moved away axially slightly in the direction which increases the axial clearance between the inner half-races 6 and 7.

The next phase of mounting consists in screwing a nut 27 onto the external screw thread 26 of the shaft 22 and in tightening this nut 27 against the inner half-race 7 and moving the latter until it comes into contact with the inner half-race 6, eliminating the axial clearance between these two half-races 6 and 7 and thus preloading the double row ball bearing. To lock the mounting in this position, a lock nut 28 is then screwed onto the external screw thread 26 of the shaft 22 until it comes up against the nut 27 and it is then locked in position.

Starting out from this configuration, any increase in the tightness of the nut 27 leads to the additional loads being transmitted from the gear 20 into the inner half-race 6, then from the latter into the axial end part 8 of the one-piece outer race 4' through the large-diameter balls 2.

In consequence, once the bearing has reached the preload by the two inner half-races 6 and 7 coming into contact through the tightening of the nut 27, this preload is not altered by any additional tightening, which means that this preload does not have to be adjusted, and the bearing preloads itself automatically by the tightening of the nut 27 which, like the lock nut 28, is depicted only in the upper half of the section that is FIG. 4, the lower half depicting the mounting before the nut 27 and the lock nut 28 are tightened, which tightening is itself performed before the flange 12 of the outer race 4' is fixed to the housing 29 by fixing screws or bolts passing through drillings 13 in the lugs 14 of this flange 12 to be screwed into the casing 29.

In operation, the set of teeth 21 of the gear 20 transmits to the two stages of the bearing (each stage corresponding to one row of balls 2 or 3), axial forces fa and radial forces fr resulting from the meshing forces on the teeth 21. Given that there is zero clearance between the preloaded inner half-races 6 and 7, these forces are transmitted along the path previously described for any additional load resulting from an increase of the tightening of the nut 27 beyond the amount that leads the two inner half-races 6 and 7 to bear against one another, then the outer race 4' to bear in the housing 29 of the rear transmission gearbox through the flange 12 which secures the bearing to the housing 29 and the fastening screws and bolts.

What this means is that the level of axial force fa1 on the row of balls 2 closest to the set of teeth 21 is the highest, and higher than the level of axial force fa2 exerted on the other row of balls 3.

As far as the radial forces are concerned, the conclusion is the same if the shaft 22 is considered bearing on each of the two stages of the bearing: the radial force fr1 exerted at the point supported by the row of large-diameter balls 2 can be expressed by the formula fr1=−fr×l/a, where a is the axial distance between the two support points on the two stages of the bearing, and l is the distance between the support point on the stage of the row of small-diameter balls 3 and the centre of application of forces to the set of teeth 21, and the radial force fr2 on the stage of small-diameter balls 3 can be expressed by the formula: fr2=−fr−fr1=fr(l/a−1)<fr. In consequence, as the row of balls 2 closest to the set of teeth 21 of the gear 20 is the most heavily loaded, it is sized larger than the other row of balls 3, which is indeed the case because the balls 2 of the row closest to the set of teeth 21 have a diameter greater than that of the other balls 3. The different dimensions of the balls 2 and 3 make it possible to optimize the premounted and preloaded modular assembly consisting of the gear 20 with its set of teeth 21 secured coaxially to the tubular shaft 22, the double row angular contact ball bearing with two asymmetric rows of balls 2 and 3 mounted on the shaft 22 of the gear 20 so that the shaft 22 is pushed into the two inner half-races 6 and 7 of the bearing and so that the row of larger-diameter balls 2 is arranged towards the teeth 21 of the gear 20, and the preloading device comprising the nut 27 and the lock nut 28 and equipping the shaft 22 of the gear 20 to axially preload the inner half-races 6 and 7 of the bearing before this modular assembly is mounted directly on the housing 29 by fixing the flange 12 to the latter, without the need for adjusting the clearance on mounting or for adjusting the bevel pairs, because the gear 20 thus has its set of teeth 21 correctly positioned in the axial direction, and the gear 20 is mounted in rotation with respect to the housing 29 at the same time and directly via the rolling bearing consisting of the two-stage bearing used, and offset axially with respect to the set of teeth 21 on the side of the larger-diameter end of this set of teeth, by having the stage equipped with the row of larger-diameter balls 2 on the same side as this set of teeth 21.

This cantilever mounting of the gear 20 on the double row ball bearing makes it possible to minimize the build-up of dimensions between the gear 20 and the housing 29, by virtue of its simplicity, and gives a smaller bulk while at the same time making it possible for the user easily to mount and remove the modular assembly described above, thus considerably simplifying maintenance operations and greatly reducing their cost.

FIG. 5 depicts a second exemplary mounting of a gear of the bevel gear pair of a second exemplary helicopter auxiliary transmission gearbox, using the double row ball bearing 1 with two asymmetric rows of balls 2 and 3 of FIGS. 1 to 3. There is, once again, a gear 30 with bevel-cut teeth 31 secured to one axial end of a tubular shaft 32 which, in this example, is a stepped shaft with several substantially cylindrical axial parts 32a, 32b and 32c, connected by substantially frustoconical parts 32d and 32e converging axially on the side away from the set of teeth 31. On the external faces of the substantially cylindrical parts 32b and 32c, the shaft 32 has sets of external axial splines 33, projecting radially outwards to engage with complementary sets of splines on the inside, for example of the tail end of a tail transmission shaft (not depicted) driven in rotation from the main transmission gearbox, to drive the rotation of the gear 30 and of its shaft 32 about their common axis X—X, if the gear 30 is the input gear in this tail transmission gearbox.

On the same side as its larger-diameter end, the set of teeth 31 is connected to the stepped part of the shaft 32 by a frustoconical web 32f which also supports an axial part 34 of cylindrical overall shape delimiting, on its external radial face, a cylindrical bearing surface bordered by a shoulder 35 on the same side as the set of teeth 31, and onto which the two inner half-races 6 and 7 of the bearing are pushed, under the same conditions as in the example of FIG. 4, that is to say in such a way that the row of large-diameter balls 2 is on the same side as the set of teeth 31.

In this example, the preload on the inner half-races 6 and 7 loading them against one another is provided by an externally threaded nut 37 screwed into a tapped part 36 of the internal bore of the axial part 34, this nut 37 supporting a curved stop 38 which, when the nut 37 is screwed into the tapped bore 36, bears against the inner half-race 7 and shifts the latter axially towards and against the inner half-race 6 to preload the bearing in the same way as in the example of FIG. 4.

After these operations, the premounted and preloaded modular assembly consisting of the gear 30 with its set of teeth 31 and its shaft 32, of the bearing 1 and of the preloading device with its nut 37 and its stop 38 is fixed directly via the radial flange 12 of the bearing 1 against the housing 39 of the transmission gearbox by axial bolts 40 passing through the flange 12 to be screwed into the housing 39 and at the same time holding against the flange 12 an annular cover 41, the central part of which surrounds the shaft 32 via a dust seal 42.

In the upper part of FIG. 5, the set of teeth 31 of the gear 30 has been depicted in engagement with complementary bevel teeth of another gear 43 of the bevel gear pair of this tail transmission gearbox. If the gear 30 is the input gear, as described hereinabove, then the other gear 43 of the bevel gear pair is arranged as a gearwheel secured in terms of rotation with the hub-mast assembly of a tail rotor, to drive this tail rotor in rotation.

However, the bevel gear 43, partially depicted, may be the input gear of this tail transmission gearbox, similar to the gear 20 of the example of FIG. 4, and which in this case drives the output gear 30, the set of teeth 31 of which is arranged as a gearwheel, the shaft 32 of which is an output shaft secured in terms of rotation by its axial splines 33 to the mast-hub assembly of the corresponding tail rotor.

In both instances, the mounting of FIG. 5, using a modular assembly similar to the one described with reference to FIG. 4, affords the same advantages of compactness, lightness of weight, simplicity and ease of mounting and of removal, without adjusting the clearance, and of allowing excellent axial positioning of the set of teeth 31 of the gear.

FIG. 6 depicts the mounting in terms of rotation and in a precise axial position of a gear, which is the main gearwheel of a helicopter main transmission gearbox, with respect to the housing of this box, and using a double row angular contact bearing 1' with two asymmetric rows of balls 2 and 3. This bearing 1' essentially differs from that of FIGS. 1 to 3 only in that each of the outer raceways 15' and 16' of the respective inner half-races 6' and 7' of the inner race 5' has its concavity facing not only radially towards the outside of the bearing 1', but also axially towards the other inner half-race 7' or 6'. For the remainder, the structure of the bearing 1' is unchanged by comparison with that of the bearing 1 of FIGS. 1 to 3, which means that the same numerical references denote the same elements in FIGS. 1 to 3 and 6.

The gear 50 comprises bevel teeth 51, arranged as a main gearwheel secured, near the smaller-diameter end of the set of teeth 51, to an axial end of a tubular shaft 52, of cylindro-conical overall shape, stretching axially from the larger-diameter end of the set of teeth 51 and converging axially on the opposite side to the set of teeth 51, as far as its other axial end, to which a second set of bevel-cut teeth 53 are secured, the set belonging to an output gear of the main transmission gearbox to a tail transmission shaft for connection to an auxiliary transmission gearbox, and which are intended for driving a tail rotor in rotation. The sets of teeth 51 and 53 and the shaft 52 are coaxial about the axis X—X.

Near the set of teeth 51, the shaft 52 has an axial part 54 of cylindrical overall shape, the external radial face of which constitutes a cylindrical bearing surface delimited by a shoulder 55 projecting radially outwards, on the side where the shaft 52 meets the set of teeth 51, and an external screw thread 56 on a cylindrical axial part of the external face of the shaft 52 in its frustoconical portion that meets the set of teeth 53.

The inner half-races 6' and 7' of the bearing 1' are pushed, under the same conditions as in the examples of FIGS. 4 and 5, onto the cylindrical bearing surface on the outside of the part 54 of the shaft 52, until the inner half-race 6' of the stage of the bearing 1' comprising the large-diameter balls 2 bears against the shoulder 55. The row of large-diameter balls 2 is therefore on the same side as the set of teeth 51.

The inner half-races 6' and 7' are preloaded against each other as in the example of FIG. 4, using the nut 57 screwed onto the external screw thread 56 of the shaft 52 and tightened against the inner half-race 7' until the axial clearance between the inner half-races 6' and 7' is eliminated, as explained before. When the bearing 1' has been preloaded in this way, a lock nut 58 is screwed onto the screw thread 56 of the shaft 52 and tightened against the nut 57, then locked in position.

After these operations, the premounted and preloaded modular assembly consisting of the gear 50 with its set of teeth 51 and its shaft 52 bearing the second set of teeth 53, of the bearing 1' and of the preloading device with the nut 57 and the lock nut 58 is fixed directly by the radial flange 12 of the bearing 1' against the housing 59 of the main transmission gearbox by axial bolts 60 passing through this flange 12 and screwed into the housing 59.

The upper right-hand part of FIG. 6 depicts the set of teeth 51 of the gear 50 engaged with a complementary set of bevel teeth of another gear 61, mounted in rotation and positioned axially in the housing 59 to drive the main gearwheel 51. The lower right-hand part of FIG. 6 also depicts a bevel gear 63 on the front end of a tail transmission shaft (not depicted) and the set of teeth of which is in engagement with the set of teeth 53 of the output gear 62 of the main transmission gearbox.

In this mounting, the two sets of teeth 51 and 53 at the axial ends of the shaft 52 are each cantilever-mounted on the bearing 1', but the latter is arranged in such a way that its row of large-diameter balls 2 is on the same side as that one of the two sets of teeth 51 and 53 which is axially loaded the most heavily, that is to say the set of teeth 51 of the main wheel of the main transmission gearbox.

This mounting has the same advantages as those of FIGS. 4 and 5, namely excellent compactness, great lightness of weight and simplicity of structure, great ease of mounting and of removal, the absence of adjustment of the clearance and of the preload, and the fact that it yields excellent axial positioning simultaneously for both sets of teeth 51 and 53 borne by the shaft 52. Finally, the modular assembly consisting of the shaft 52 with its two sets of teeth 51 and 53, of the bearing 1' and of the preloading device 57-58 is, as in the previous examples, an assembly which can be directly mounted, preassembled and preloaded, in the housing.

What is claimed is:

1. A double row angular contact ball bearing comprising:

a one-piece outer race, having two internal raceways arranged substantially in opposition and formed of raceway grooves having a concave side which faces radially towards an axis of the bearing and each of which faces axially towards one respective side of the bearing, an inner race, consisting of two matched inner half-races, arranged side by side, able to be axially preloaded against each other when the bearing is mounted, and each having an external raceway formed of a raceway groove having a concave side which faces radially towards the outside of the bearing and in such a way that said external raceway of each inner half-race substantially faces a respective one of said two internal raceways of said outer race, and two rows of balls, in which the balls in each row are arranged between two facing raceways one of which is arranged in said outer race and the other of which is arranged in one respectively of said inner half-races, and in angular contact with said raceways, wherein said balls of one of the two rows are of a diameter greater than the diameter of said balls of the other row, so that the bearing has two asymmetric rows of balls, and wherein said one-piece outer race has two axial end parts with a cylindrical or cylindro-conical external face, of which one, surrounding the row of larger-diameter balls, has an outside diameter greater than the outside diameter of the other part, surrounding the smaller-diameter row of balls, and at least one ball cage, retaining said balls of a row of balls is arranged between said outer race and a corresponding inner half-race.

2. Bearing according to claim 1, wherein said two inner half-races have an internal bore of a same diameter.

3. Bearing according to one of claims 1 and 2, wherein said two inner half-races have external raceways of substantially the same diameter measured at the bottom of the corresponding raceway groove.

4. Bearing according to one of claims 1 and 2, wherein said raceway groove forming said external raceway of each of said two inner half-races has a concave side also facing axially towards the other inner half-race.

5. Bearing according to one of claims 1 and 2, wherein said one-piece outer race has a fastening flange, projecting radially outwards substantially between said two axial end parts.

6. Bearing according to one of claims 1 and 2, wherein said ball cage is centered about at least one cylindrical bearing surface on an external face of said corresponding inner half-race.

* * * * *